Dec. 16, 1924.

E. E. KING ET AL

PISTON

Filed Nov. 4, 1922

1,519,918

E. E. King
H. A. Worrel
INVENTOR

BY Victor J. Evans
ATTORNEY

Patented Dec. 16, 1924.

1,519,918

UNITED STATES PATENT OFFICE.

EDSON E. KING AND HOMER A. WORRELL, OF FOLLETT, TEXAS.

PISTON.

Application filed November 4, 1922. Serial No. 599,155.

*To all whom it may concern:*

Be it known that we, EDSON E. KING and HOMER A. WORRELL, citizens of the United States, residing at Follett, in the county of Lipscomb and State of Texas, have invented new and useful Improvements in Pistons, of which the following is a specification.

This invention relates to pistons for internal combustion engines, and an object of the invention is to provide a piston which will materially eliminate the carrying of lubricating oil by the piston upwardly into the cylinders of the engine where it ordinarily accumulates upon the spark plugs causing carbonization thereof and resulting in inefficient operation of the engine.

More specifically, this invention comprehends the provision of a piston having downwardly and outwardly bevel portions at the lower edge of the lowermost ring groove of the upper set of grooves, and at the lower edge of the lower ring groove adjacent to the butt end of the piston, and also to provide a plurality of diagonally inclining openings opening out through said bevel surfaces for guiding lubricating oil into the interior of the piston from where it may return to the crank casing.

Other objects of the invention will appear in the following detailed description taken in connection with the accompanying drawings wherein:—

Figure 1:
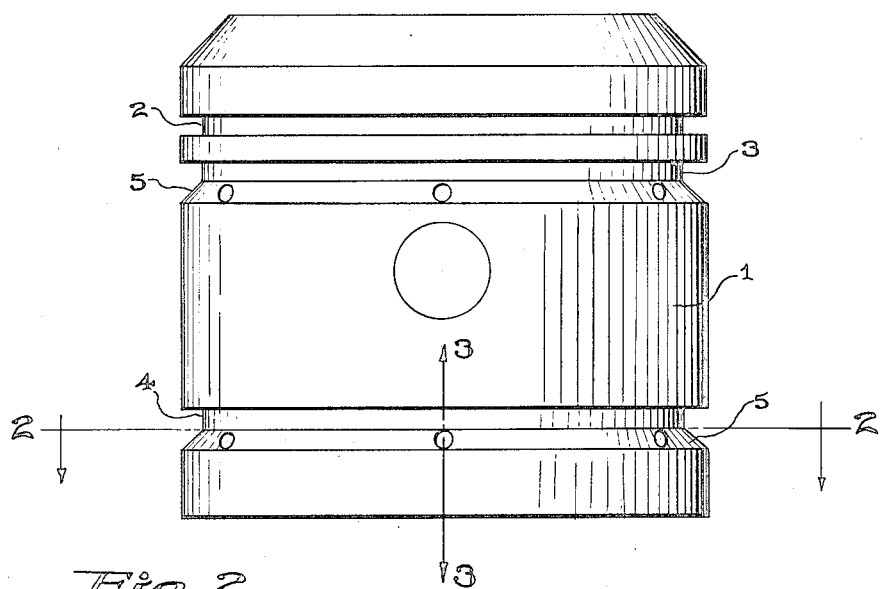
Fig. 1 is a side elevation of the improved piston.
Figure 2:
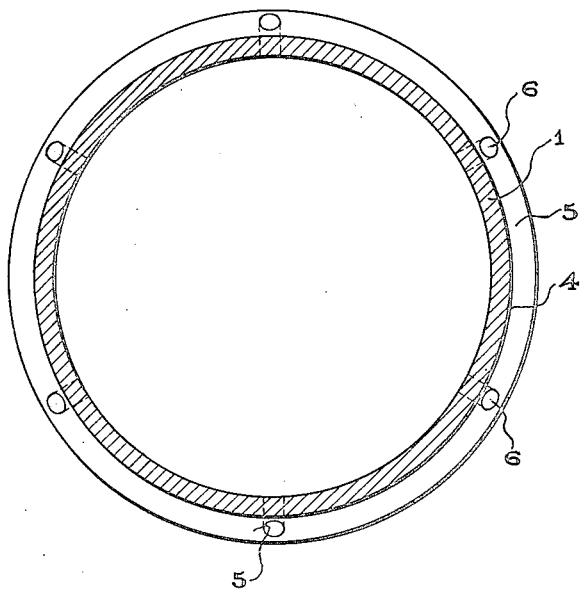
Fig. 2 is a cross section through the piston taken on the line 2—2 of Fig. 1.
Figure 3:
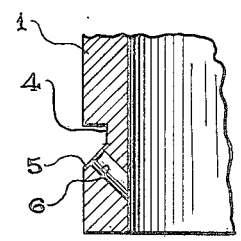
Fig. 3 is a vertical section on the line 3—3 of Fig. 1.

Referring more particularly to the drawings, the piston 1 is provided with the upper set of piston ring receiving grooves 2 and 3 and with the piston receiving groove 4 adjacent the base or butt of the piston. The piston 1 is cut away at the lower edges of the piston ring receiving grooves 3 and 4, as clearly shown in the drawings, providing downwardly and outwardly inclining bevel surfaces 5 which act as sheds for lubricating oil. The piston 1 is also provided with a plurality of circumferentially spaced openings 6 which extend diagonally therethrough at right angles to the bevel surfaces 5. These openings 6 open out through the bevel surfaces 5 and into the interior of the piston for guiding lubricating oil into the piston from where it may return to the crank case.

From the foregoing description taken in connection with the accompanying drawings it will be apparent that the improved piston structure will not only eliminate the disadvantages of the pumping of the lubricating oil into the upper part of the cylinder which results in carbonizing the spark points, but which will also cause a material savings in lubricating oil.

It is, of course, to be understood that the invention may be constructed in other manners and the parts associated in different relations, and therefore, we do not desire to be limited in any manner except as set forth in the claims hereunto appended.

Having thus described our invention what we claim is:—

As a new article of manufacture, a piston having annular ring receiving grooves therein, certain of said grooves having the lower walls thereof inclined outwardly and downwardly, the inner edges of said inclined walls being flush with the inner walls of the grooves and the outer edges being flush with the outer surface of the piston, and said pistons having openings leading from the inclined walls at an angle thereto through the body of the piston to the interior thereof.

In testimony whereof we affix our signatures.

EDSON E. KING.
HOMER A. WORRELL.